United States Patent [19]

Ogawa et al.

[11] Patent Number: 5,247,115
[45] Date of Patent: Sep. 21, 1993

[54] REACTIVE POLYSILOXANE AND METHOD FOR MANUFACTURE

[75] Inventors: Takuya Ogawa; Toshio Suzuki, both of Kanagawa, Japan

[73] Assignee: Dow Corning Japan, Ltd., Tokyo, Japan

[21] Appl. No.: 18,973

[22] Filed: Feb. 18, 1993

[30] Foreign Application Priority Data

Feb. 28, 1992 [JP] Japan ................................. 4-42565

[51] Int. Cl.$^5$ ............................. C07F 7/08; C07F 7/18
[52] U.S. Cl. .................................................... 556/452
[58] Field of Search ........................................ 556/452

[56] References Cited

U.S. PATENT DOCUMENTS 2,676,182  4/1954  Daudt et al. ..................... 260/448.2
2,814,601  11/1957  Currie et al. ........................ 260/29.1
2,857,356  10/1958  Goodwin, Jr. ......................... 260/42
4,073,801  2/1978  Moretto et al. ................. 556/452 X
4,113,760  9/1978  Frey et al. ............................ 556/452
4,578,494  3/1986  Marko et al. ........................ 556/452

FOREIGN PATENT DOCUMENTS 61-195129  8/1986  Japan .
3-91139526  6/1991  Japan .

Primary Examiner—Paul F. Shaver
Attorney, Agent, or Firm—William F. Boley

[57] ABSTRACT

The present invention concerns novel reactive polysiloxanes and a method for their manufacture. More specifically, the present invention concerns polysiloxanes of mainly $SiO_{4/2}$ polysiloxane units which have highly reactive halogen atoms bonded to silicon and a method for their manufacture.

27 Claims, No Drawings

REACTIVE POLYSILOXANE AND METHOD FOR MANUFACTURE

BACKGROUND OF INVENTION

The present invention concerns novel reactive polysiloxanes and a method for their manufacture. More specifically, the present invention concerns polysiloxanes of mainly $SiO_{4/2}$ polysiloxane units which have highly reactive halogen atoms bonded to silicon and a method for their manufacture.

Polysiloxanes comprised of monofunctional siloxane units and tetrafunctional siloxane units have been known and used in many fields. Common manufacturing methods involve hydrolysis of water-soluble silicate salts such as water glass, etc. under acidic conditions, with termination of the polymerization using trimethylchlorosilane, etc. (U.S. Pat. Nos. 2,676,182 and 2,814,601); cohydrolysis of alkyl silicates and hydrolyzable trialkylsilane mixtures (U.S. Pat. No. 2,857,356; Japanese Kokai Patent Application No. Hei 3{1991}-139526); and addition of alkyl silicates or their partial hydrolyzates to trialkylsilane hydrolyzates (Japanese Kokai Patent Application No. Sho 61{1986}-195129). These methods include hydrolysis processes under acidic conditions, and imparting functional groups unstable to water (e.g., Si-halogen group) to the polysiloxanes are very difficult. There have not been any reports on reactive polysiloxanes comprised of monofunctional units and tetrafunctional units which easily undergo nucleophilic substitution.

It is a task of the present invention to provide novel and useful reactive polysiloxanes comprised of monofunctional units and tetrafunctional units which easily undergo nucleophilic substitution, especially to provide Si- functional polysiloxanes.

The polysiloxanes of the present invention are novel compounds useful for the manufacture of branched polysiloxanes of mainly polysiloxane units of $SiO_{4/2}$ and diorganopolysiloxane unit branches, as the starting materials for silicone elastomers. They are also useful as additives for improving flow characteristics of silicone fluids.

SUMMARY OF INVENTION

The present invention concerns novel reactive polysiloxanes and a method for their manufacture. More specifically, the present invention concerns polysiloxanes of mainly $SiO_{4/2}$ polysiloxane units which have highly reactive halogen atoms bonded to silicon and a method for their manufacture.

DESCRIPTION OF INVENTION

The present invention is a composition comprising a reactive polysiloxane described by formula

  (I)

where each $R^1$ is independently selected from a group consisting of alkyls comprising one to eight carbon atoms, haloalkyls comprising one to eight carbon atoms, alkenyls comprising two to eight carbons atoms, and aryls; Q is a halogen; $2 \leq x \leq 500$; $2 \leq y \leq 150$; and $0.3 \leq y/x \leq 3$; and a composition comprising a reactive polysiloxane described by formula

  (II)

where R is selected from a group consisting of hydrogen atom and alkyls of one to eight carbon atoms; each $R^1$ is independently selected from a group consisting of alkyls comprising one to eight carbon atoms, haloalkyls comprising one to eight carbon atoms, alkenyls comprising two to eight carbon atoms, and aryls; each $R^2$ is independently selected from a group consisting of hydrogen atom, alkyls comprising one to eight carbon atoms, haloalkyls comprising one to eight carbon atoms, alkenyls comprising two to eight carbon atoms, and aryls; Q is a halogen atom; $2 \leq x \leq 500$; $2 \leq y+z+w \leq 150$; $2 \leq y$; $0 \leq z$; $0 \leq w \leq 15$; $z+w$ is greater than zero; $0.3 \leq (y+z+w)/x \leq 3$; and $0 \leq w/(y+z+w) \leq 0.1$.

The present invention also comprises methods for the preparation of reactive polysiloxanes described by formula (I) and by formula (II).

The reactive polysiloxanes of the present invention have x number of $SiO_{4/2}$ units in a molecule; x is 2 or more, preferably 4 or more. While not restricted, x has an upper limit of 500. If x exceeds 500, the solubility of the resulting reactive polysiloxanes in organic solvents decreases significantly; thus, handling becomes very difficult. Considering workability, x should be below 300, more preferably below 150.

In the reactive polysiloxanes of the present invention, the number of monofunctional units is represented by $(y+z+w)$, which can be 2 to up to 150. It is difficult to synthesize molecules having higher numbers of monofunctional units.

The monofunctional unit to tetrafunctional unit ratio $(y+z+w)/x$ is from 0.3 to 3. With decreasing $(y+z+w)/x$ values, the reactive polysiloxane molecular weight increases; however, it is not favorable for this value to be below 0.3, because of a marked decrease of the reactive polysiloxane solubility in organic solvents. On the other hand, if this value exceeds 3, this is also not favorable because no effects of the tetrafunctional siloxane units are attained.

Each substituent $R^1$ is independently chosen from a group consisting of alkyls comprising 1-8 carbon atoms, haloalkyls comprising 1-8 carbon atoms, alkenyls comprising 2-8 carbon atoms, and aryls. In terms of economy, methyl group, vinyl group, 3,3,3-trifluoropropyl group and phenyl group are preferred.

Each substituent $R^2$ can be independently chosen from a group consisting of hydrogen atom, alkyls comprising 1-8 carbon atoms, haloalkyls comprising 1-8 carbon atoms, alkenyls comprising 2-8 carbon atoms, and aryls; they may be the same as $R^1$. In terms of economy, hydrogen atom, methyl group, vinyl group, and phenyl group are preferred.

The $(R^1{}_2R^2SiO_{\frac{1}{2}})$ unit is not an essential component of the reactive polysiloxanes of the present invention; thus z may be zero. This unit determines the number of silicon-bonded halogen atoms in the reactive polysiloxanes of the present invention. Namely, while the monofunctional to tetrafunctional siloxane unit ratio is determined by $(y+z+w)/x$, at the same value, an increasing z value results in a decreased number of silicon-bonded halogens. The z value has an upper limit, because synthesis of the molecules becomes difficult if the $(y+z+w)$ value is higher than 150.

Depending on the synthesis conditions for hydrogen-functional polysiloxanes as the starting materials, the $(RO_{\frac{1}{2}})$ unit may remain, and its number is less than 15 in a molecule and its content, based on the sum of all the units other than the $(SiO_{4/2})$ unit, is less than 10 mol %.

Next, the method for the manufacture of the reactive polysiloxanes of the present invention is explained. The starting materials are hydrogen-functional polysiloxanes containing ($SiO_{4/2}$) units, ($R^1{}_2HSiO_{\frac{1}{2}}$) units, ($R^1{}_2R^2SiO_{\frac{1}{2}}$) units, and ($RO_{\frac{1}{2}}$) units; these compounds are reacted with halogen-containing compounds. As described below, such a halogenation reaction may be accelerated by energy-beam irradiation or metal chloride or radical initiators.

The halogen compounds that can be used in the present invention are carbon tetrachloride, 1,1,1-trichloroethane, 1,1,1,2-tetrachloroethane, hexachloroethane, benzyl chloride, phosphorus pentachloride, carbon tetrabromide, phosphorus pentabromide, benzyl bromide, phosphorus tribromide, N-bromosuccinimide, aluminum chloride, carboxylic acid chlorides, bromides, etc. The halogen compounds are used in an amount of 100–5000 mol % based on the starting materials.

The energy beam that can be used here may be composed of UV-rays, gamma-rays, X-rays, etc.

The metal chlorides are chlorides of transition metals such as chromium, manganese, iron, cobalt, nickel, copper, palladium, platinum, mercury, etc., and nontransition metals such as tin, antimony, lead, etc.; palladium chloride is especially preferred. While not restricted, the metal chlorides are used in an amount of 0.01–100 mol % based on the starting materials.

The radical initiators are diacyl peroxides such as octanoyl peroxide, decanoyl peroxide, benzoyl peroxide, etc.; dialkyl peroxides such as t-butylcumyl peroxide, dicumyl peroxide, etc.; peroxy esters such as t-butyl peroxyisobutyrate, t-butyl peroxybenzoate, etc.; azonitriles such as 2,2'-azobisisobutyronitrile, 2,2'-azobis(2,4-dimethylvaleronitrile), etc.; benzoyl peroxide is especially preferred. While not restricted, the radical initiators are used in an amount of 0.1–100 mol % based on the starting materials. Good results are obtained at a range of 1–10 mol %.

It is preferred to carry out the present reaction in the halogen-containing compounds used as the halogenating agents, while it is also possible to use organic solvents if needed. The organic solvents that can be used are benzene, toluene, hexane, heptane, dichloromethane, tetrahydrofuran, 1,4-dioxane, acetone, methyl ethyl ketone, etc. However, the solvents are not limited to those given above. The solvents may be used singly or as mixtures thereof.

The reaction temperature may be between the melting point and refluxing temperature of the halogen-containing compounds or the solvents used. Using the refluxing temperature is preferred.

Upon completion of the reaction, if needed, the insolubles are filtered out and the solvent distilled off to obtain reactive polysiloxanes as described by formula (I) and by formula (II). Usually, the conversion in the halogenation reaction is less than 100%; thus, the reactive polysiloxanes obtained as the final products often contain residual unreacted Si-H groups.

The hydrogen-functional polysiloxanes used as the starting materials for the reactive polysiloxanes of the present invention can be prepared by conventional methods. For example, dialkylsilanes are hydrolyzed under acidic conditions, and the resulting solution is treated with alkyl silicates or their partial hydrolyzates.

The following examples are provided to illustrate the present invention. These examples are not intended to limit the present claims.

EXAMPLE 1

(Not within the scope of the present invention.) In a 1-L three-necked flask were placed 105 g of distilled water, 70 g of concentrated hydrochloric acid, 50 g of methyl alcohol and 201.5 g of tetramethyldisiloxane; the resulting mixture was cooled at 0° C. treated with 507.4 g of tetramethoxysilane over a period of 4 h; then, the mixture was stirred at the same temperature for 1 h. The methyl alcohol was distilled off in vacuo at a temperature below 20° C.; the residue was washed with water and dried to obtain 358 g (yield 90%) polymer corresponding to ($SiO_{4/2}$)$_{22}$($Me_2HSiO_{\frac{1}{2}}$)$_{20}$, with a molecular weight of 2700 as measured by a vapor pressure method.

EXAMPLE 2

(Not within the scope of the present invention.) In a 1-L three-necked flask were placed 105 g of distilled water, 70 g of concentrated hydrochloric acid, 50 g of methyl alcohol, 161.2 g of tetramethyldisiloxane and 48.7 g of hexamethyldisiloxane; the resulting mixture at 30° C. was treated with 507.4 g of tetramethoxysilane over a period of 4 h, and then the mixture was stirred at the same temperature for 1 h. Methyl alcohol was distilled off in vacuo at a temperature below 20° C.; the residue was washed with water and dried to obtain 370 g (yield 91%) polymer corresponding to ($SiO_{4/2}$)$_{22}$-($Me_2HSiO_{\frac{1}{2}}$)$_{16}$($Me_3SiO_{\frac{1}{2}}$)$_4$, with a molecular weight of 2,700 as measured by a vapor pressure method.

EXAMPLE 3

A solution of 20 g of the hydrogen-functional polysiloxane obtained in Example 1 in 100 mL of carbon tetrachloride was treated with 3.0 g of benzoyl peroxide, heated under reflux for 40 h, and freed from the solvent. The residue was treated with n-hexane, filtered from insolubles, and freed from n-hexane by distillation to obtain 25 g (yield 99%) of a polymer corresponding to ($SiO_{4/2}$)$_{22}$($Me_2ClSiO_{\frac{1}{2}}$)$_{20}$. Analysis showed: IR: trace of 2141 cm$^{-1}$ absorption for Si-H; $^1$H-NMR (CDCl$_3$ solvent, CHCl$_3$ standard, $\delta = 7.24$ ppm): 0.47 (s, SiClMe$_2$); $^{29}$Si-NMR (CDCl$_3$ solvent, TMS standard, $\delta = 0$ ppm): 6.5 (SiClMe$_2$), and $-110.9$ ($SiO_{4/2}$).

EXAMPLE 4

A solution of 20 g of the hydrogen-functional polysiloxane obtained in Example 2 in 100 mL of carbon tetrachloride was treated with 2.8 g of benzoyl peroxide, heated under reflux for 40 h, and freed from the solvent. The residue was treated with n-hexane, filtered from insolubles, and freed from n-hexane by distillation to obtain 23.5 g (yield 98%) of a polymer corresponding to ($SiO_{4/2}$)$_{22}$($Me_2ClSiO_{\frac{1}{2}}$)$_{16}$($Me_3SiO_{\frac{1}{2}}$)$_4$. Analysis showed: IR: trace of 2141 cm$^{-1}$ absorption for Si-H; $^1$H-NMR (CDCl$_3$ solvent, CHCl$_3$ standard, $\delta = 7.24$ ppm): 0.12 (s, SiMe$_3$) and 0.47 (s, SiClMe$_2$); $^{29}$Si-NMR (CDCl$_3$ solvent, TMS standard, $\delta = 0$ ppm); 11.6 (SiMe$_3$), 6.5 (SiClMe$_2$), and $-110.9$ ($SiO_{4/2}$).

EXAMPLE 5

Example 3 was repeated using 2.6 g of palladium chloride in place of 3.0 g of benzoyl peroxide to obtain 24.8 g (yield 98%) of a polymer corresponding to ($SiO_{4/2}$)$_{22}$($Me_2ClSiO_{\frac{1}{2}}$)$_{20}$. Analysis showed: IR: trace of 2141 cm$^{-1}$ absorption for Si-H; $^1$H-NMR (CDCl$_3$ solvent, CHCl$_3$ standard, $\delta = 7.24$ ppm): 0.47 (s, SiClMe$_2$);

$^{29}$Si-NMR (CDCl$_3$ solvent, TMS standard, δ=0 ppm): 6.5 (SiClMe$_2$) and −110.9 (SiO$_{4/2}$).

EXAMPLE 6

Example 4 was repeated using 2.4 g of palladium chloride in place of 2.8 g of benzoyl peroxide to obtain 23.5 g (yield 98%) of a polymer corresponding to (SiO$_{4/2}$)$_{22}$(Me$_2$ClSiO$_{\frac{1}{2}}$)$_{16}$(Me$_3$SiO$_{\frac{1}{2}}$)$_4$. Analysis showed: IR: trace of 2141 cm$^{-1}$ absorption for Si-H; $^1$H-NMR (CDCl$_3$ solvent, CHCl$_3$ standard, δ=7.24 ppm): 0.12 (s, SiMe$_3$) and 0.47 (s, SiClMe$_2$); $^{29}$Si-NMR (CDCl$_3$ solvent, TMS standard, δ=0 ppm): 11.6 (SiMe$_3$), 6.5 (SiClMe$_2$), and −110.9 (SiO$_{4/2}$).

EXAMPLE 7

Example 3 was repeated using 1.0 g of benzoyl peroxide at a refluxing time of 15 h to obtain 24.5 g (yield 90%) of a polymer corresponding to (SiO$_{4/2}$)$_{22}$(Me$_2$ClSiO$_{\frac{1}{2}}$)$_{18}$(Me$_2$HSiO$_{\frac{1}{2}}$)$_2$. Analysis showed: IR: 2141 cm$^{-1}$ absorption for Si-H; $^1$H-NMR (CDCl$_3$ solvent, CHCl$_3$ standard, δ=7.24 ppm): 0.22 (s, SiHMe$_2$), 0.47 (s, SiClMe$_2$), and 4.71 (s, SiHMe$_2$); $^{29}$Si-NMR (CDCl$_3$ solvent, TMS standard, δ=0 ppm): 6.5 (SiClMe$_2$), −3.1 (SiHMe$_2$), and −110.9 (SiO$_{4/2}$).

EXAMPLE 8

A solution of 20 g of the hydrogen-functional polysiloxane obtained in Example 3 and 75 g of carbon tetrabromide in 150 mL of toluene was treated with 3.0 g of benzoyl peroxide, heated under reflux for 40 h, and freed from excess carbon tetrachloride and toluene by distillation. The residue was treated with n-hexane, filtered from insolubles, and freed from n-hexane by distillation to obtain 31.7 g (yield 99%) of a polymer corresponding to (SiO$_{4/2}$)$_{22}$(Me$_2$BrSiO$_{\frac{1}{2}}$)$_{20}$. Analysis showed: IR: trace of 2141 cm$^{-1}$ absorption for Si-H; $^1$H-NMR (CDCl$_3$ solvent, CHCl$_3$ standard, δ=7.24 ppm): 0.62 (s, SiBrMe$_2$) $^{29}$Si-NMR (CDCl$_3$ solvent, TMS standard, δ=0 ppm): 4.6 (SiBrMe$_2$), and −110.9 (SiO$_{4/2}$).

EXAMPLE 9

A solution of 65 g of phosphorus pentabromide in 450 mL of dichloromethane was treated gradually with 20 g of the hydrogen-functional polysiloxane obtained in Example 3 in an ice bath. The resulting mixture was refluxed at room temperature for 5 h and distilled in vacuo to obtain 31.5 g (yield 98%) of a polymer as the distillation residue corresponding to (SiO$_{4/2}$)$_{22}$(Me$_2$BrSiO$_{\frac{1}{2}}$)$_{20}$. Analysis showed: IR: trace of 2141 cm$^{-1}$ absorption for Si-H; $^1$H-NMR (CDCl$_3$ solvent, CHCl$_3$ standard, δ=7.24 ppm): 0.62 (s, SiBrMe$_2$); $^{29}$Si-NMR (CDCl$_3$ solvent, TMS standard, δ=0 ppm): 4.6 (SiBrMe$_2$), and −110.9 (SiO$_{4/2}$).

I claim:

1. A composition comprising a reactive polysiloxane described by formula $$(SiO_{4/2})_x(R^1{}_2QSiO_{\frac{1}{2}})_y;$$

where each $R^1$ is independently selected from a group consisting of alkyls comprising one to eight carbon atoms, haloalkyls comprising one to eight carbon atoms, alkenyls comprising two to eight carbons atoms, and aryls; Q is a halogen; $2 \leq x \leq 500$; $2 \leq y \leq 150$; and $0.3 \leq y/x \leq 3$.

2. A reactive polysiloxane according to claim 1, where each $R^1$ is independently selected from a group consisting of methyl, phenyl, vinyl, and 3,3,3-trifluoropropyl.

3. A reactive polysiloxane according to claim 1, where Q is chlorine.

4. A reactive organosilane according to claim 1, where $4 \leq x < 150$.

5. A reactive organosilane according to claim 1, where ratio of y to x is from 0.3 to 3.

6. A reactive organosilane according to claim 1, where each $R^1$ is independently selected from a group consisting of methyl, phenyl, vinyl, and 3,3,3-trifluoropropyl; Q is chlorine; $4 \leq x < 150$; and ratio of y to x is from 0.3 to 3.

7. A composition comprising a reactive polysiloxane described by formula $$(SiO_{4/2})_x(R^1{}_2QSiO_{\frac{1}{2}})_y(R^1{}_2R^2SiO_{\frac{1}{2}})_z(RO_{\frac{1}{2}})_w;$$

where R is selected from a group consisting of hydrogen atom and alkyls of one to eight carbon atoms; each $R^1$ is independently selected from a group consisting of alkyls comprising one to eight carbon atoms, haloalkyls comprising one to eight carbon atoms, alkenyls comprising two to eight carbon atoms, and aryls; each $R^2$ is independently selected from a group consisting of hydrogen atom, alkyls comprising one to eight carbon atoms, haloalkyls comprising one to eight carbon atoms, alkenyls comprising two to eight carbon atoms, and aryls; Q is a halogen atom; $2 \leq x \leq 500$; $2 \leq y+z+w \leq 150$; $2 \leq y$; $0 \leq z$; $0 \leq w \leq 15$; z+w is greater than zero; $0.3 \leq (y+z+w)/x \leq 3$; and $0 \leq w/(y+z+w) \leq 0.1$.

8. A reactive polysiloxane according to claim 7, where each $R^1$ is independently selected from a group consisting of methyl, vinyl, 3,3,3-trifluoropropyl, and phenyl.

9. A reactive polysiloxane according to claim 7, where Q is chlorine.

10. A reactive polysiloxane according to claim 7, where $4 \leq x < 150$.

11. A reactive polysiloxane according to claim 7, where ratio of (y+z+w) to x is from 0.3 to 3.

12. A reactive polysiloxane according to claim 7, where each $R^2$ is independently selected from a group consisting of hydrogen atom, methyl, vinyl, and phenyl.

13. A reactive polysiloxane according to claim 7, where each $R^1$ is independently selected from a group consisting of methyl, phenyl, vinyl, and 3,3,3-trifluoropropyl; each $R^2$ is independently selected from a group consisting of hydrogen atom, methyl, vinyl, and phenyl; Q is chlorine; $4 \leq x < 150$; and ratio of (y+z+w) to x is from 0.3 to 3.

14. A method for manufacture of a reactive polysiloxane described by formula $$(SiO_{4/2})_x(R^1{}_2QSiO_{\frac{1}{2}})_y,$$

the method comprising: reacting a hydrogen-functional polysiloxane comprised of (SiO$_{4/2}$) units and (R$^1{}_2$HSiO$_{\frac{1}{2}}$) units with a halogen compound; where each $R^1$ is independently selected from a group consisting of alkyls comprising one to eight carbon atoms, haloalkyls comprising one to eight carbon atoms, alkenyls comprising two to eight carbons atoms, and aryls; Q is a halogen; $2 \leq x \leq 500$; $2 \leq y \leq 150$; and $0.3 \leq y/x \leq 3$.

15. A method according to claim 14, where the halogen compound is selected from a group consisting of carbon tetrachloride, 1,1,1-trichloroethane, 1,1,1,2- tetrachloroethane, hexachloroethane, benzyl chloride, phosphorous pentabromide, carbon tetrabromide, phosphorus pentabromide, benzyl bromide, phosphorus tribromide, N- bromosuccinimide, aluminum chloride, carbonxylic acid chlorides, and carbonxylic acid bromides.

16. A method according to claim 14 further comprising an accelerator selected from a group consisting of energy-beam irradiation, metal chloride, and radical initiator.

17. A method according to claim 16, where the metal chloride is palladium chloride.

18. A method according to claim 16, where the radical initiator is benzoyl peroxide.

19. A method according to claim 14 further comprising an organic solvent.

20. A method according to claim 14, where each $R^1$ is independently selected from a group consisting of methyl, phenyl, vinyl, and 3,3,3-trifluoropropyl; Q is chlorine; $4 \leq x < 150$; and ratio of y to x is from 0.3 to 3.

21. A method for manufacture of a reactive polysiloxane described by formula

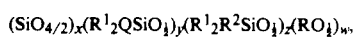

the method comprising: reacting a hydrogen-functional polysiloxane comprised of $(SiO_{4/2})$ units, $(R^1_2HSiO_{1/2})$ units, $(R^1_2R^2SiO_{1/2})$ units, and $(RO_{\frac{1}{2}})$ units with a halogen compound; where R is selected from a group consisting of hydrogen atom and alkyls of one to eight carbon atoms; each $R^1$ is independently selected from a group consisting of alkyls comprising one to eight carbon atoms, haloalkyls comprising one to eight carbon atoms, alkenyls comprising two to eight carbon atoms, and aryls; each $R^2$ is independently selected from a group consisting of hydrogen atom, alkyls comprising one to eight carbon atoms, haloalkyls comprising one to eight carbon atoms, alkenyls comprising two to eight carbon atoms, and aryls; Q is a halogen atom; $2 \leq x \leq 500$, $2 \leq y+z+w \leq 150$; $2 \leq y$; $0 \leq z$; $0 \leq w \leq 15$; z+w is greater than zero; $0.3 \leq (y+z+w)/x \leq 3$; and $0 \leq w/(y+z+w) \leq 0.1$.

22. A method according to claim 21, where the halogen compound is selected from a group consisting of carbon tetrachloride, 1,1,1-trichloroethane, 1,1,1,2- tetrachloroethane, hexachloroethane, benzyl chloride, phosphorous pentabromide, carbon tetrabromide, phosphorus pentabromide, benzyl bromide, phosphorus tribromide, N- bromosuccinimide, aluminum chloride, carbonxylic acid chlorides, and carbonxylic acid bromides.

23. A method according to claim 21 further comprising an accelerator selected from a group consisting of energy-beam irradiation, metal chloride, and radical initiator.

24. A method according to claim 23, where the metal s palladium chloride.

25. A method according to claim 23, where the radical initiator is benzoyl peroxide.

26. A method according to claim 21 further comprising an organic solvent.

27. A method according to claim 21, where each $R^1$ is independently selected from a group consisting of methyl, phenyl, vinyl, and 3,3,3-trifluoropropyl; each $R^2$ is independently selected from a group consisting of hydrogen atom, methyl, vinyl, and phenyl; Q is chlorine; $4 \leq x < 150$; and ratio of (y+z+w) to x is from 0.3 to 3.

* * * * *